Aug. 28, 1962 J. W. GRATIAN 3,051,796

TRANSVERSE BOUNDARY-DISPLACEMENT RECORDING HEAD

Filed Dec. 22, 1958

INVENTOR.
JOSEPH W. GRATIAN
BY
Richard G. Stahr
ATTORNEY

United States Patent Office 3,051,796

Patented Aug. 28, 1962

3,051,796

TRANSVERSE BOUNDARY-DISPLACEMENT RECORDING HEAD

Joseph W. Gratian, Rochester, N.Y., assignor to General Dynamics Corporation, Rochester, N.Y., a corporation of Delaware Filed Dec. 22, 1958, Ser. No. 782,304
7 Claims. (Cl. 179—100.2)

Figures 1, 2A, 2B, 3, 4:
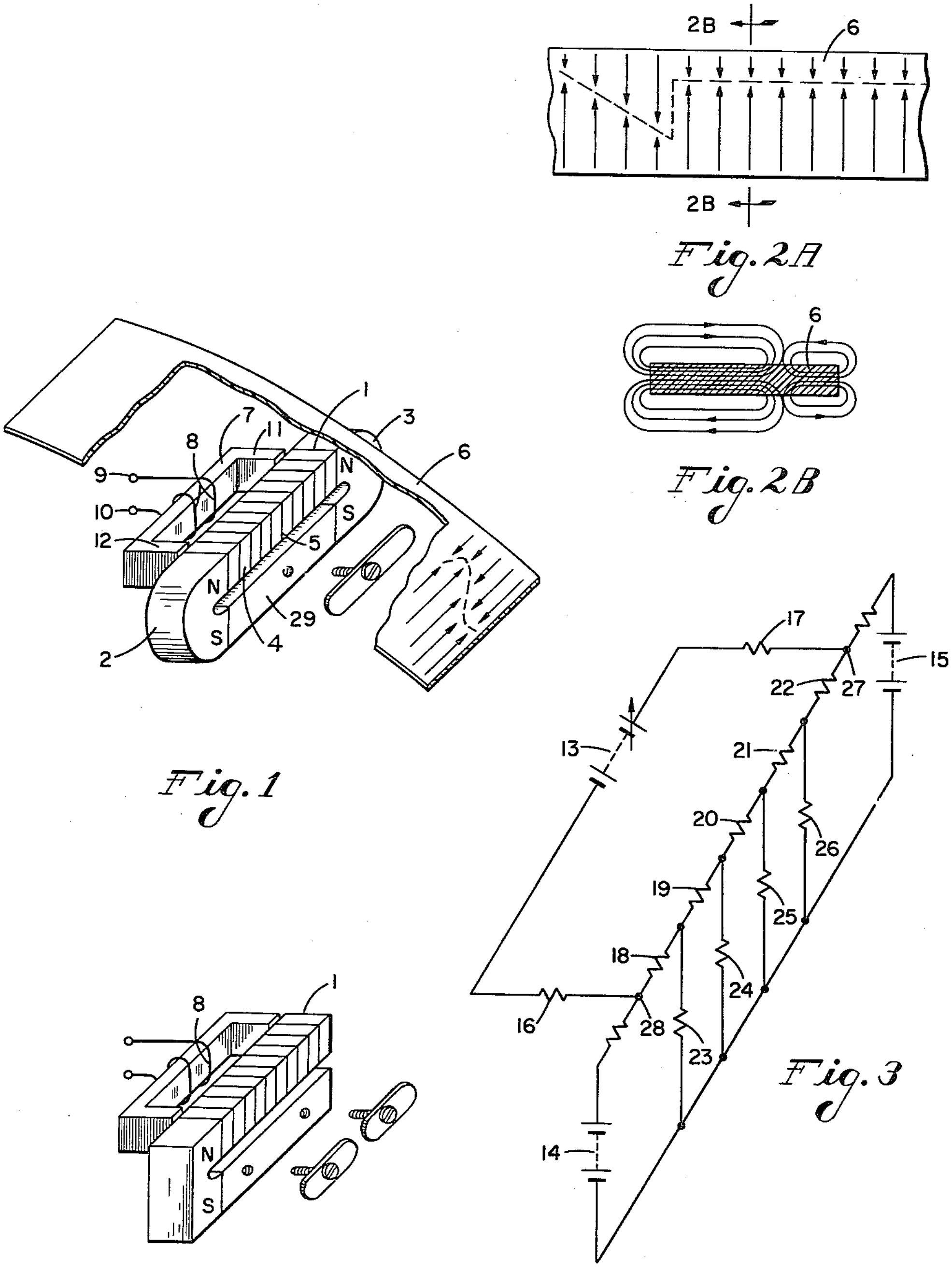

This invention relates to recording heads and, more specifically, to a transverse boundary-displacement recording head.

Although the art of recording electrical signals upon specially designed magnetic recording mediums such as tape or wire have been known and used for some time, the utility of the magnetic recording processes have been greatly increased through recent developments whereby visible magnetic recordings may be produced.

In these visible magnetic recording techniques, the information magnetically recorded upon a recording medium such as a magnetic tape may be rendered visible through the process of dipping the recording medium into an ink consisting of finely divided magnetic particles suspended in a suitable fluid and is generally known as "magnetography."

There have been prior art devices which produce a variable area magnetic recording which, if magnetically inked, would produce a visible graphic image. To produce a graphic recording similar to that produced by a pen recorder, which produces a dark line on a light background, it is necessary that flux be emitted only from a narrow track upon the recording medium rather than from a magnetized area across the width of the recording medium.

It is, therefore, an object of this invention to provide an improved magnetic recording head.

It is another object of this invention to provide a recording head which produces a magnetic image of an electrical signal upon a magnetic recording medium as a narrow track from which flux emanates.

It is another object of this invention to provide a transverse boundary-displacement recording head in which the magnetic record of an electrical signal appears on the recording medium as a narrow track only from which flux is emitted and is positioned transversely of the direction of movement of the recording medium in correspondence with the variations in amplitude of the electrical signal being recorded.

In accordance with this invention, a transverse boundary-displacement recording head is provided wherein a source of constant magnetomotive force and a variable magnetomotive force which varies in correspondence with the variations in amplitude of a signal to be recorded are applied across a magnetic conductor having a plurality of alternate low reluctance and high reluctance segments and arranged in a direction substantially transverse to the direction of motion of and with one edge in contact with a recording medium wherein the one high reluctance segment between any two low reluctance segments which are magnetically saturated in the same direction constitutes a zero signal boundary recording gap, the two magnetomotive forces being poled in relation with each other in such a maner that the position of the recording gap is determined by the relative magnitude thereof.

For a better understanding of the present invention, together with further objects, advantages and features thereof, reference is made to the following description and accompanying drawings in which:

FIG. 1 illustrates a preferred embodiment of the present invention;

FIGS. 2A and 2B graphically illustrate magnetization patterns in reference to a recording medium;

FIG. 3 is an electrical analysis of the magnetic circuit of the preferred embodiment of FIG. 1; and FIG. 4 is an alternate embodiment of the present invention.

Essentially, the device of this invention contemplates the employment of a magnetic conductor, illustrated in FIG. 1 by reference numeral 1, which provides a path for the flux produced by a source of constant magnetomotive force which may be one or more permanent magnets. In the preferred embodiment of this invention as illustrated in FIG. 1, two permanent magnets are employed, indicated by reference numerals 2 and 3, for the purpose of establishing the zero signal boundary recording gap substantially at the center of the magnetic conductor in a manner to be later explained. This magnetic conductor comprises a plurality of alternate low and high reluctance segments, typically illustrated in FIG. 1 by reference numerals 4 and 5, respectively, and, therefore, may be made up of a series of laminations each of a material possessing the property of low reluctance to magnetic flux lines arranged subsantially as indicated in FIG. 1 wherein the space between laminations constitutes the high reluctance segments. Further, the high reluctance segments may be thin laminations of a material possessing the property of high reluctance to magnetic lines of force or they may be a very narrow airgap or seam which is naturally present as the laminations are stacked against each other. This magnetic conductor is positioned substantially in a direction transverse to the direction of motion of and with one surface in contact with a recording medium, such as a magnetic tape, indicated in FIG. 1 by reference numeral 6. In the operation of the recording head of this invention, any one of the high reluctance segments located between any two of the low reluctance segments which are magnetized in the same polarity sense and at substantially equal magnitude constitutes a zero signal boundary recording gap which saturates the recording medium in a manner now to be described.

Considering for the moment only the source of constant magnetomotive force, permanent magnets 2 and 3, and the magnetic conductor 1, and assuming that the relative strength of permanent magnets 2 and 3 to be equal, high reluctance segment 5 constitutes the zero signal boundary recording gap. This is true because at this point the magnetic lines of force produced by the respective permanent magnets 2 and 3 are cancelled out by each other in that each traverses equal low reluctance segments and high reluctance segments. Therefore, the low reluctance segment on each side of high reluctance segment 5 is magnetized in the same polarity sense to substantially equal magnitude.

To provide a source of variable magnetomotive force proportional to the variations in amplitude of the signal to be recorded, an electromagnet having a pole piece 7 of a material presenting a low reluctance path to lines of magnetic flux, such as soft iron, and extending across the magnetic conductor 1 is provided. While the pole piece has been herein illustrated as being solid, it may be made up of stacked laminations of a magnetic material. To provide the ampere turns required to produce a magnetomotive force therein, a coil 8 is wound thereon which is connected to the source of electrical signals to be recorded, not shown, through terminals 9 and 10.

The flow of current through coil 8, produced by the electrical signal being recorded, produces a magnetomotive force which varies in magnitude with the variations in amplitude of the signal being recorded and, hence, magnetic flux lines in pole piece 7 which induce north and south poles at the opposite ends thereof which also vary in intensity with the magnetomotive force which produces them. Should, at any given time, end 11 of pole piece 7 have induced therein a north pole, this magnetomotive force would combine with the magnetomotive force of permanent magnet 3 and would move the zero signal boundary recording gap to a high reluctance segment to the left of segment 5. The greater the magnitude of magnetic flux induced in end 11 of pole piece 7, therefore, the farther the zero signal boundary recording gap would be moved to the left of segment 5. Similarly, in the event the direction of current flow through coil 8 is reversed with the recorded signal, a north pole would then be induced in end 12 of pole piece 7, thereby increasing the magnitude of the magnetic flux at this end which would move the zero signal boundary recording gap to a high reluctance segment to the right of gap 5 an amount proportional to the magnitude of the induced north magnetic pole in end 12 of pole piece 7 as in the case as previously described. In this manner, then, it is apparent that the zero signal boundary recording gap is determined by the relative magnitude of the constant and variable magnetomotive force.

An electrical analogy of this action is illustrated by the circuit of FIG. 3 where the variable potential source 13 corresponds to the variable magnetomotive force produced by the signal to be recorded; constant potential sources 14 and 15 represent the constant magnetomotive force produced by permanent magnets 2 and 3; and current and resistance is analogous to flux and reluctance, respectively. Resistors 16 and 17 represent the reluctance of the joint between magnetic conductor 1 and pole piece 7 and equal resistance resistors 18, 19, 20, 21 and 22 represent the reluctances of the high reluctance segments between the low reluctance segments of magnetic conductor 1. Equal resistance resistors 23, 24, 25 and 26 represent the reluctances of the leakage paths between the segments 4 and magnetic shunt 29 of FIG. 1 and are much greater than resistances 18, 19, 20, 21 and 22. Considering for the moment only potential sources 14 and 15 and assuming them to be of equal potential, the current distribution in the network would be such that the opposing currents would cancel in resistor 20, thereby resulting in zero current flow therethrough. As current is analogous to magnetic flux, resistor 20, therefore, would be comparable to the zero signal boundary recording gap 5 of FIG. 1. Should potential source 13 now be connected to the network as indicated, the current entering the network through point 27 and resistor 22 would be greater than that entering the network at point 28 and resistor 18 which would result in a cancellation of the opposing currents in either resistor 19 or 18, depending upon the magnitude of current entering point 27. The greater this magnitude, of course, the farther to the left of resistor 20 this cancellation would occur. Similarly, should the polarity of source 13 be reversed, the greater amount of current would enter the network at point 28, thereby producing a cancellation of opposing currents in one of the resistors to the right of resistor 20, that is, 21 or 22, depending upon the magnitude.

The magnetization pattern produced in the recording medium 6 is graphically illustrated by FIG. 2A. It may be noted that as the relative magnitudes of the variable and constant magnetomotive forces change, the point of zero signal boundary is relocaated transversely across recording medium 6. FIG. 2B illustrates a cross-section of the recording medium at plane 2B—2B of FIG. 2A and illustrates the magnetic flux lines which are produced by the magnets induced in the recording medium. It will be noted that the same polarity sense is induced on opposite sides of the zero signal boundary as has previously been described. As the area of concentrated flux is that area at which the flux lines internal to the magnetic recording medium emerge therefrom, should this recording medium be immersed in a magnetic ink, the magnetic particles therein would cling thereto in the form of a fine line.

Another embodiment of the present invention is illustrated in FIG. 4 where only a single permanent magnet source of constant magnetomotive force is employed. This embodiment, however, although it operates in a manner similar to that illustrated in FIG. 1, is less desirable in that a direct current bias must be impressed upon coil 8 to establish the zero signal boundary recording gap at the center of magnetic conductor 1 in the absence of a signal.

Again, returning to FIG. 1, either of permanent magnets 2 or 3 may also be omitted, through the medium of making pole piece 7 a permanent magnet also.

While definite polarities have been established in the discussion of this invention, it is to be specifically understood that they may be reversed without departing from the spirit of this invention so long that the relationship is preserved.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A transverse boundary-displacement recording head comprising a magnetic conductor composed of a linear series of low reluctance segments having narrow high reluctance segments interposed between adjacent low reluctance segments, said magnetic conductor being adapted to be oriented in cooperative relationship with a magnetic medium movable in a direction transverse to the length of said conductor, magnet means for applying a magnetomotive force of a given polarity to one end of said magnetic conductor and a magnetomotive force of the same given polarity to the other end of said magnetic conductor and for varying the relative magnitudes, but not the polarities, of the magnetomotive forces with respect to each other in response to a signal applied thereto.

2. The recording head defined in claim 1, wherein said magnet means includes a permanent magnet for applying a fixed magnetomotive force of a given polarity to said one end of said magnetic conductor, and an electromagnet for applying a magnetomotive force which varies in amplitude in response to said applied signal between said one end and said other end of said magnetic conductor.

3. The recording head defined in claim 2, wherein said electromagnet is biased to apply a fixed component of magnetomotive force of said given polarity to said other end of said magnetic conductor and of a polarity opposite to said given polarity to said one end of said magnetic conductor, the magnitude of said fixed component of magnetomotive force being smaller than the magnitude of the fixed magnetomotive force applied by said permanent magnet and greater than the maximum amplitude of the magnetomotive force responsive to said signal.

4. The recording head defined in claim 3, wherein said permanent magnet is a U magnet having one pole thereof coupled to said one end of said magnetic conductor, and wherein said magnet means further includes a magnetic bar forming a pole piece coupled to the other pole of said permanent magnet and oriented parallel to said magnetic conductor.

5. The recording head defined in claim 2, wherein said magnet means further includes a second permanent magnet for applying a fixed magnetomotive force of the same given polarity as said first-mentioned permanent magnet to said other end of said magnetic conductor.

6. The recording head defined in claim 5, wherein the fixed magnitudes of the first-mentioned and second permanent magnets are substantially equal to each other and are greater than the maximum amplitude of the magnetomotive force responsive to said signal.

7. The recording head defined in claim 6, wherein said first-mentioned and second permanent magnets are U magnets, a given pole of said first-mentioned permanent magnet being coupled to said one end of said magnetic conductor and said given pole of said second permanent magnet being coupled to said other end of said magnetic conductor, and wherein said magnet means further includes a magnetic bar forming a pole piece coupled between the other poles of said first-mentioned and second permanent magnets and oriented parallel to said magnetic conductor, whereby said magnetic bar provides a magnetic shunt between said first-mentioned and second permanent magnets.

References Cited in the file of this patent

UNITED STATES PATENTS

| | | |
|---|---|---|
| 2,743,320 | Daniels et al. | Apr. 24, 1956 |
| 2,806,904 | Atkinson et al. | Sept. 17, 1957 |
| 2,850,581 | Gratian | Sept. 2, 1958 |
| 2,955,169 | Stedtnitz | Oct. 4, 1960 |
| 2,995,632 | Daniels | Aug. 8, 1961 |

FOREIGN PATENTS

| | | |
|---|---|---|
| 552,290 | Italy | Nov. 30, 1956 |
| 1,026,974 | Germany | Mar. 27, 1958 |